(12) United States Patent
Nguyen et al.

(10) Patent No.: US 6,395,811 B1
(45) Date of Patent: *May 28, 2002

(54) PHASE CHANGE SOLID IMAGING MATERIAL

(75) Inventors: My T. Nguyen, Kirland (CA); Vu Doan, Canoga Park, CA (US); Kelly Kwo; Loc V. Bui, both of Valencia, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,160

(22) Filed: Apr. 11, 2000

Related U.S. Application Data

(63) Continuation-in-part of application No. 09/439,263, filed on Nov. 11, 1999, now Pat. No. 6,133,353.

(51) Int. Cl.$^7$ .................................................. C08J 3/00
(52) U.S. Cl. ...................... 524/198; 523/161; 524/199; 524/230; 524/270; 524/272; 524/487; 524/507; 524/514
(58) Field of Search ................................. 523/160, 161; 524/198, 199, 230, 270, 272, 487, 507, 514

(56) References Cited

U.S. PATENT DOCUMENTS

| | | | |
|---|---|---|---|
| 2,409,712 A | 10/1946 | Schweitzer | 525/124 |
| 3,012,991 A | 12/1961 | Schultheis et al. | 521/128 |
| 3,653,932 A | 4/1972 | Berry et al. | 106/22 |
| 3,796,678 A | 3/1974 | Bartizal | 525/124 |
| 3,963,710 A | 6/1976 | Aufdermarsh, Jr. | 424/322 |
| 4,011,311 A | 3/1977 | Noomen et al. | 424/65 |
| 4,293,470 A | 10/1981 | Cuscurida | 528/49 |
| 4,297,501 A | 10/1981 | Becker et al. | 560/24 |
| 4,334,032 A | 6/1982 | Patton, Jr. et al. | 521/115 |
| 4,381,403 A | 4/1983 | Falcone et al. | 560/24 |
| 4,390,369 A | 6/1983 | Merritt et al. | 106/31 |
| 4,484,948 A | 11/1984 | Merritt et al. | 106/31 |
| 4,501,915 A | 2/1985 | McCoy | 560/157 |
| 4,537,960 A | 8/1985 | Merger et al. | 544/86 |
| 4,555,357 A | 11/1985 | Kausga et al. | 252/511 |
| 4,665,146 A | 5/1987 | Tortorello et al. | 526/304 |
| 4,684,956 A | 8/1987 | Ball | 346/1.1 |
| 4,810,820 A | 3/1989 | Slack et al. | 560/27 |
| 4,830,671 A | 5/1989 | Frihart et al. | 106/27 |
| 4,851,045 A | 7/1989 | Taniguchi | 106/31 |
| 4,889,506 A | 12/1989 | Connolly et al. | 439/874 |
| 4,889,560 A | 12/1989 | Jaeger et al. | 106/27 |
| 4,889,761 A | 12/1989 | Titterington et al. | 428/195 |
| 5,006,170 A | 4/1991 | Schwarz et al. | 106/20 |
| 5,141,749 A | 8/1992 | Herting et al. | 424/442 |
| 5,151,120 A | 9/1992 | You et al. | 106/27 |
| 5,162,490 A | 11/1992 | Drawert et al. | 528/87 |
| 5,195,430 A | 3/1993 | Rise | 100/168 |
| 5,208,034 A | 5/1993 | Herting et al. | 424/442 |
| 5,221,335 A | 6/1993 | Williams et al. | 524/487 |
| 5,286,288 A | 2/1994 | Tobias et al. | 106/20 B |
| 5,372,852 A | 12/1994 | Titterington et al. | 427/288 |
| 5,389,720 A | 2/1995 | Markusch et al. | 524/83 P |
| 5,389,958 A | 2/1995 | Bui et al. | 347/103 |
| 5,421,868 A | 6/1995 | Ayalia-Esquilin et al. | 106/20 R |
| 5,496,879 A | 3/1996 | Griebel et al. | 524/320 |
| 5,507,864 A | 4/1996 | Jaeger et al. | 106/22 A |
| 5,574,078 A | 11/1996 | Elwakil | 523/161 |
| 5,593,486 A | 1/1997 | Oliver et al. | 106/22 |
| 5,597,856 A | 1/1997 | Yu et al. | 524/227 |
| 5,607,501 A | 3/1997 | Fujioka | 106/22 A |
| 5,621,022 A | 4/1997 | Jaeger et al. | 523/161 |
| 5,780,528 A | 7/1998 | Titterington et al. | 523/161 |
| 5,881,648 A | 3/1999 | Pavlin | 101/491 |
| 5,902,841 A | 5/1999 | Jaeger et al. | 523/161 |
| 5,919,839 A | 7/1999 | Titterington et al. | 523/161 |

FOREIGN PATENT DOCUMENTS

| | | |
|---|---|---|
| DE | 42 05 636 A1 | 8/1993 |
| DE | 42 05 713 A1 | 8/1993 |
| EP | 0 187 352 A2 | 7/1986 |
| EP | 0 206 286 A1 | 12/1986 |
| EP | 0 819 739 A2 | 1/1998 |
| EP | 0 844 287 A1 | 5/1998 |
| EP | 0 869 161 A2 | 10/1998 |
| GB | 2 294 939 A | 5/1996 |
| WO | WO 94/04619 | 3/1994 |
| WO | WO 94/14902 | 7/1994 |
| WO | WO 96/02399 | 2/1996 |
| WO | WO 96/02446 | 2/1996 |
| WO | WO 96/10051 | 4/1996 |
| WO | WO 97/12003 | 3/1997 |
| WO | WO 98/26013 | 6/1998 |
| WO | WO 00/11092 | 3/2000 |

*Primary Examiner*—Peter Szekely
(74) *Attorney, Agent, or Firm*—Ralph D'Alessandro

(57) ABSTRACT

A component to control the viscosity of phase change material formulations is made by reacting selected nucleophiles, including fatty acid/alcohol reactants with an isocyanate, is disclosed. The addition of the isocyanate and the different nucleophiles will create a viscosity modifying component of low viscosity that can be formulated with higher molecular weight polyamide resins to achieve increased toughness in phase change solid imaging materials and carrier compositions used to make phase change ink jet inks.

39 Claims, No Drawings

PHASE CHANGE SOLID IMAGING MATERIAL

This application is a continuation-in-part application of U.S. Ser. No. 09/439,263 filed Nov. 11, 1999 now U.S. Pat. No. 6,133,353.

BACKGROUND OF THE INVENTION

1. Field of the Invention

The present invention relates to waxes made by reacting isocyanates with selected nucleophiles such as alcohol reactants and amines. The nucleophiles are used to achieve certain desirable properties in urethane/polyamide formulations. The present invention also relates to solid imaging materials used in the rapid prototyping industry, as well as to phase change ink compositions, both generally and in specific compositions, containing such resins and/or waxes. Still further, the present invention relates to the process of using such phase change compositions containing such resins and/or waxes in a printing device.

2. Description of the Relevant Art

In general, phase change materials or inks (sometimes referred to as "hot melt inks") are in the solid phase at ambient temperature, but exist in the liquid phase at the elevated operating temperature of an ink jet printing device. At the ink jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwert Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. Subtractive primary colored phase change inks can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. As exemplified in U.S. Pat. No. 5,221,335, assigned to Coates Electrographics Ltd., the colorants can also include pigments. U.S. Pat. No. 5,621,022, assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium, the droplets solidify immediately upon contact with the substrate, migration of ink along the printing medium is prevented and dot quality is improved. More recently, the use of phase change solid imaging material with ink jet print heads has permitted the rapid prototyping and manufacturing industry to increase speed, reduce costs and improve part quality. This is also true of the processes and solid imaging compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT patent application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. The oligourethane is obtained by reacting an aliphatic or aromatic diisocyanate with at least a stoichiometric amount of either: (i) a monohydric alcohol component; or (ii) a monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol [e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (PGBE) and propylene glycol phenyl ether (PPL)]; esterified dihydric aliphatic alcohol [e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot-melt printing], or dihydric polyakylene glycol. This PCT patent application defines the monohydric alcohol component as either a monohydric aliphatic alcohol (e.g. $C_1$ to $C_{22}$ alcohols), an etherified dihydric aliphatic alcohol [e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (PGBE) and propylene glycol phenyl ether (PPL)]; esterified dihydric aliphatic alcohol [e.g. the esterifying acid may be an ethylenically unsaturated acid (such as acrylic acid or methacrylic aid), thereby introducing ethylenic unsaturation into the oligourethane and rendering it suitable for eventual further additional polymerization (curing) after having been applied to a substrate by hot-melt printing], or dihydric polyalkylene glycol. This PCT application further defined the dihydric alcohol component as a dihydric aliphatic alcohol or a dihydric polyalkylene glycol [e.g. ethylene glycol, polyethylene glycol (PEG 1500), polypropylene glycol (PPG 750), 1000 and 1500), trimethylene glycol, dipropylene glycol, methylpropanediol and 1.6-hexanediol].

Another PCT patent application, WO 97/12003 also assigned to Coates Brothers PLC, discloses hot melt ink jet base materials that are urethane-amide reaction products obtained from the reaction of isocyanates with one or more functional amides. The urethane-amides are intended to have improved compatibility with viscosity modifying additives.

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Phase change materials, whether used in ink jet printing or three-dimensional rapid prototyping and manufacturing applications, have a need for improved toughness. Toughness can be imparted to formulations by use of higher molecular weight resins. However, these higher molecular weight resins concomitantly impart greater viscosity to formulations, thereby making them unsuitable for jetting from ink jet print heads.

Phase change materials can also have a shrinkage problem upon solidification. In printing applications this can manifest itself in cracking of the ink on the final receiving substrate, or through a perceived lack of toughness by the partial or complete flaking off of the ink material from the final receiving substrate or from cohesive failure. In three-dimensional modeling or rapid prototyping applications excessive strain due to shrinkage in the jetted materials leads to internal stress that can result in a distorted part shape or distorted or missing features. This is a form of thermal distortion.

Thermal distortion in three-dimensional modeling parts occurs when the strength of the phase change material is less than the stress at a particular point in time. Stress results in build artifacts that manifest themselves in curl, dent, cracks or out of roundness. Thermal runaway is a particularly aggravated form of thermal distortion that occurs when the temperature of the part is greater than the freezing point of the part. This artifact causes part features to not be present in the build part because the material flows out of feature or shape before freezing or hardening.

Therefore, there is still a need for new materials for novel and different applications of phase change materials. There is also a need for relatively low viscosity resins, including nonpolymeric resins, and waxes designed for phase change ink jet and other forms of phase change material printing and rapid prototyping applications, especially those requiring materials with increased toughness. These needs are solved by the present invention by providing a means to create a tougher phase change formulation with a component that controls its viscosity by using an isocyanate-derived material to control viscosity.

BRIEF SUMMARY OF THE INVENTION

It is an aspect of the present invention that a urethane compound comprising the reaction product of selected isocyanates with selected alcohol reactants is obtained.

It is another aspect of the present invention that a urethane compound having low viscosity is obtained that can be formulated with higher molecular weight polyamides to create a phase change material of increased toughness.

It is still another aspect of the present invention that a phase change solid imaging material or a phase change ink carrier composition is obtained which is an admixture of a lower viscosity component, a component to promote adhesion to a substrate, a component to impart toughness, and a component to control thermal runaway.

It is still a further aspect of the present invention that a phase change ink composition comprising an admixture of (a) a phase change carrier composition containing at least one isocyanate-derived wax, and (b) a phase change ink compatible colorant is obtained.

It is a feature of the present invention that the component to control the viscosity of the phase change formulation is a linear alkyl urethane material of low viscosity.

It is another feature of the present invention that the addition of an effective amount of the component to control viscosity to a formulation with higher molecular weight polyamide resins creates a molecule that is jettable and insensitive to build artifacts in three-dimensional modeling and to cracking, flaking, or cohesive failure in printing applications.

It is a further feature of the present invention that the linear alkyl urethane helps control the viscosity and the melting and freezing points of phase change formulations.

It is yet another feature of the present invention that the linear alkyl urethanes are isocyanate-derived waxes.

It is yet a further feature of the present invention that the linear alkyl urethanes can be combined with polyamide resins to tune the flex modulus, the flex yield stress, flex work and tensile elongation of the final phase change formulation.

It is an advantage of the present invention that the linear alkyl urethanes or isocyanate-derived waxes can be design engineered to obtain desired properties for specific printing or rapid prototyping platforms and architectures.

It is another advantage of the present invention that the isocyanate-derived waxes permit the use of higher molecular weight resins in the phase change formulation to obtain a tougher formulation.

It is still another advantage of the present invention that the isocyanate-derived waxes can be used in combination with other phase change solid imaging material or polyamide materials to obtain ink compositions and rapid prototyping solid imaging materials that display improved yield stress over prior art ink compositions and solid imaging materials.

It is yet another advantage of the present invention that the isocyanate-derived waxes have low viscosity.

It is yet a further advantage of the present invention that the low viscosity isocyanate-derived waxes permit the use of higher molecular weight polyamide resins in combination with a component to promote adhesion and a component to control shrinkage or thermal runaway to form a phase change solid imaging material or phase change ink carrier composition.

These and other aspects, features and advantages are obtained by the use of reaction products of selected isocyanates with selected alcohols to produce low viscosity isocyanate-derived waxes suitable for use in phase change solid imaging materials and inks that may be employed in rapid prototyping or printing applications.

DESCRIPTION OF THE PREFERRED EMBODIMENTS

The term "isocyanate-derived wax" as used in the present specification and claims is defined as any crystalline or semicrystalline waxy material derived from the reaction of a fatty isocyanate with a suitable alcohol, or the reaction of a fatty nucleophile with a fatty isocyanate.

Any suitable reaction condition for making urethane compounds by condensing alcohols with isocyanates may be employed in the practice of the present invention. Preferably, the reaction is carried out at elevated temperatures (e.g. about 60° C. to about 160° C.) in the presence of a urethane reaction catalyst such as dibutyltin dilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol typically remaining. Conceptually the reactants can be added together in any order and/or added to the reaction as physical mixtures. However, in the preferred embodiments of the invention, reaction conditions and the order of the addition of reactants are carefully controlled. Reaction conditions and reactant additions are chosen to provide a controlled exothermic reaction. When doing this, the different reactivities to isocyanates of alcohols are employed, as is the reactivity of the isocyanate group on octadecyl isocyanate. See J. H. Saunders and K. C. Frisch's "Polyurethanes Part I, Chemistry" published by Interscience of New York, N.Y. in 1962 which provides further explanation of this chemistry. This control of the reaction conditions and order of addition of the reactants is done to specifically tailor or customize the different types of molecular species in the finished phase change material so that the material will:

(1) have a controlled viscosity that is designed for a specific application, (2) have a controlled freezing and/or melting point, and (3) have consistent properties from batch to batch.

The isocyanate-derived waxes from these reactions are generally opaque waxy solids having sharp melting points in the range from about 20° C. to about 130° C. and viscosities of from about 1 cPs to about 25 cPs at 140° C. The isocyanate-derived waxes display properties such that the higher the melting point, the higher is the viscosity. While the structural activity relationships are not fully understood, it is known that the melting point, freezing point, and viscosity of the isocyanate-derived waxes are controlled by the proper choice of the mixture of nucleophiles in the reaction as illustrated in Table 1 of Example 4 below. Varying one or more of the readily available commodity alcohols used as chemical precursors will permit custom-tailoring of the properties of the isocyanate-derived wax materials.

Preferred alcohols to react with monofunctional isocyanates to make the isocyanate-derived waxes of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as ethanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<–3000), polypropylene glycol (MW<–3000), polyester polyols (MW<–3000), polyethylene glycol (MW<–3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is hexadecyl alcohol. Preferred alcohols to react with difunctional and higher isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexy-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isobomeol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Additionally, hydroxyl/amino containing compounds can be employed with monoisocyanates reacting with di- and higher functionality isocyanates. Examples of this include ethanolamine, diethanolamine, and the like.

Additionally amides or other nucleophile containing compounds can be reacted with the isocyanates (mono, di, and the like). Some examples include: urea, oleamide, stearamide, or the like.

Preferred precursors to the isocyanate-derived waxes of the present invention include mono-, di- and other polyisocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzylisocyanate; meta and para-tolylisocyanate; 2-, 3-, or 4-nitrophenylisocynates; 2-ethoxyphenyl isocyanate; 3-methoxyphenyl isocyanate; 4-methoxyphenyl isocyanate; ethyl 4-isocyanatobenzoate; 2,6-dimethylphenylisocyante; 1-naphythylisocyanate; (naphthyl) ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H.sub. 12 MDI); tetramethyl xylene diisocyanate (TMXDI); hexamethylene-1,6-diisocyanate (HDI); napthylene-1,5-diisocyanate; 3,3'- dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetratmethylene xylene diisocyanate; 4,4'-methylenebis (2,6diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functonalities include copolymers of TDI/HDI, and the like, as well as MDI oligomers.

Phase change materials of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change inks and solid imaging material of the current invention incorporate isocyanate-derived waxes as all or as part of the carrier composition or imaging material and can be a supplemental ingredient or supplemental ingredients to what is currently available as the existing phase change carrier or imaging material composition. The isocyanate-derived materials of the current invention are tailored to have the desirable properties mentioned above when used in the carrier composition of the inks or in the solid imaging material of the present invention by varying one or more of the readily available commodity chemical precursors.

The phase change carrier compositions or solid imaging material compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022, and/or pigments. They may also be used in combination with the isocyanate-derived colored resins of U.S. Pat. No. 5,780,528 to produce a phase change ink. A preferred dye to employ especially in rapid prototyping and manufacturing applications is Savinyl RLS Black available commercially from Clariant Corporation of Charlotte, N.C.

Prior art phase change inks for use in direct and indirect transfer printing systems from which the carrier compositions may be useful in solid imaging applications are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. A preferred mono-amide is stearyl stearamide. A preferred tackifier resin is a glycerol ester of hydrogenated abietic (rosin) acid and a preferred antioxidant is that provided by Uniroyal Chemical Company under the tradename Naugard 524 or that provided by Ciba Geigy Materials Management under the tradename Irganox 1010. The isocyanate-derived waxes of the present invention replace one or more of the ingredients in the above phase change ink carrier composition, or the inks or solid imaging materials can have all of the above ingredients replaced by the isocyanate-derived waxes of the present invention. One desirable characteristic of the formulations used in solid imaging for rapid prototyping and manufacturing applications is a high yield stress which provides toughness, as opposed to the low yield stress desired for formulations used in ink carrier compositions where flexibility is required. When used in solid imaging material, these formulations have improved flex modulus, flex yield stress, flex work and tensile elongation.

A component to promote adhesion to a substrate, also known as a tackifier, is added to formulations used both for rapid prototyping and manufacturing applications and ink carrier compositions. In the former, use of the component permits the build object to adhere to the support platform and in the latter usage it permits the ink to adhere to the paper, transparency, or other final receiving substrate. Suitable classes of tackifiers that may be employed, especially with solid imaging materials include rosin ester, rosin carbamate, glycerin rosin ester, hydrogenated pentaerythritol ester, hydrogenated glycerin ester, modified tall oil rosin, polymerized rosin, aromatic hydrocarbon rosin, and aliphatic hydrocarbon rosin. Preferred tackifiers, especially with solid imaging materials, include butyl [3-({[(7-isopropyl-1,4a-dimethyltetradecahydro-1-phenanthrenyl)methoxy]carbonyl}amino)-1,4,4-trimethylcyclohexyl]methyl carbamate; hexyl [3-({[(7-isopropyl-1,4a-dimethyltetradecahydro-1-phenanthrenyl)methoxy]carbon}amino)-1,4,4-trimethylcyclohexyl]methyl carbamate; octyl [3-({[(7-isopropyl-1,4a-dimethyltetradecahydro-1-phenanthrenyl)methoxy]carbonyl}amino)-1,4,4-trimethylcyclohexyl]methyl carbamate; dodecyl [3-({[(7-isopropyl-1,4a-dimethyltetradecahydro-1-phenanthrenyl)methoxy]carbonyl}amino)-1,4,4-trimethylcyclohexyl]methyl carbamate; and octadecyl [3-({[(7-isopropyl-1,4a-dimethyltetradecahydro-1-phenanthrenyl)methoxy]carbonyl}amino)-1,4,4-trimethylcyclohexyl]methyl carbamate.

Suitable components to control the viscosity of the formulation, also known as viscosity modifiers or viscosity modifying agents, in solid imaging materials include urethane wax, amide wax, alkyl wax and combinations thereof. A preferred viscosity modifying agent is a linear alkyl urethane or carbamate. The linear alkyl carbamate can be selected from the group consisting of octadecyl, octadecyl carbamate; dodecyl, octadecyl carbamate; hexadecyl, octadecyl carbamate; and hexyl, octadecyl carbamate.

Linear alkyl carbamates are preferred components to control the viscosity of the formulation, or viscosity modifiers, because they have better functionality than amide materials used previously for this purpose in phase change materials. Linear alkyl carbamates are less polar than amides, which results in less intermolecular attraction or bonding of the components in the formulation. For linear alkyl carbamates of the same molecular weight as amide materials as components of a formulation, the result is formulations that have less viscosity. This permits fine tuning of the melting point, the freezing point, and the viscosity of the final formulation by changing the length of either or both of the side chains in the carbamate structure which is characterized by the formula:

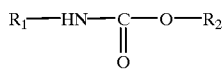

wherein $R^1$ is an isocyanate having a carbon chain length of from about $C_4$ to about $C_{60}$ and $R_2$ is an alcohol having a carbon chain length of from about $C_4$ to about $C_{60}$. This lower viscosity permits the use of higher molecular weight resins to obtain increased toughness in the final formulation that is jetted from the ink jet print head.

The following examples of the synthesis of urethane tetra-amides, carbamate waxes, and solid imaging material are presented to illustrate the scope of the invention and to be illustrative of solid imaging materials, as well as phase change ink formulations, that can be employed successfully using a urethane tetra-amide or a carbamate wax, without any intent to limit the invention to the specific materials, process or structure employed.

In the following examples, the synthesis of urethane tetra-amide and linear alkyl carbamate was performed in a glass kettle equipped with heating metal, temperature controller, mechanical stirrer, water condenser and nitrogen gas inlet. The completeness of the reactions was followed by using a Model 1760 FTIR Spectrophotometer available commercially from Perkin-Elmer of Norwalk, Conn. The UV-Visible spectra of the products were recorded using a Shimazu Model UV-1201 spectrophotometer. The melting point of the products were determined using a Model DSC 550 differential scanning calorimeter available commercially from Instrument Specialist Incorporated. The viscosity of the obtained products was measured using a high temperature Brookfield Model DV-II+ viscometer.

EXAMPLE 1

About 300 grams of 12-hydroxystearic acid available commercially from CasChem of Bayonne, N.J., about 286 grams of stearic acid available commercially from Adrich Chemicals of Milwaukee, Wis., and about 61 grams of ethylenediamine commercially available from Aldrich Chemicals were added and stirred into the mixture in the reaction kettle. The reaction was heated to about 110° C. for two hours. The reaction temperature was increased to about 180° C. for an additional two hours. The reaction temperature was decreased to about 80° C. About 111 grams of isophorone diisocyanate commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a solubilizing agent in the form of a translucent tan solid product was obtained having a melting point at about 133° C. and viscosity of about 87.1 cPs at 150° C.

EXAMPLE 2

A solid imaging material formulation using the solubilizing agent of Example 1 was formulated by mixing in a 200ml glass beaker about 51 grams of hexadecyl, octadecyl carbamate, available from American Dye Source, Inc. of Mount Royal, Canada; about 8 grams of hexyl, octadecyl carbamate, also available from ADS of Mount Royal, Canada; about 20 grams of hexyl [3-({[(7-isopropyl-1,4a-dimethyltetradecahydro-1-henanthrenyl)methoxy]carbonyl}amino)-1,4,4-trimethylcyclohexyl]methyl carbamate; about 14 grams of the translucent tan solubilizing agent solid product obtained in Example 1; about 2.5 grams of Polyamide Resin 2942 available from Arizona Chemical; about 2.5 grams of Polyamide Resin 2614 available from Arizona Chemical; and about 2.0 grams of Irganox 1010, an anti-oxidant available commercially from Ciba Geigy, were mixed together at a temperature of about 140° C. on a hot plate and then blended by stirring in a temperature controlled mantle at about 115° C. for about a half hour. After stirring, the imaging material base was filtered through a 1 micron Pall filter available from Pall Filters of East Hills, N.Y. At a pressure of about five pounds per square inch, the filtered phase change material was poured into molds and allowed to solidify, forming disks of solid imaging material. The solid imaging material created employed the diurethane tetra-amide from Example 1 as a solubilizing agent, a carbamate viscosity modifier, and a tackifier that yielded a tough, flexible formulation suitable for solid imaging materials. The material had a viscosity at about 135° C. of about 12.5 cPs. The Irganox 1010 anti-oxidant is used to suppress the thermal oxidation of the carbamate.

EXAMPLE 3

This example demonstrates a method of synthesizing a preferred viscosity modifier for use in a phase change material that is jetted from an ink jet print head. More specifically, the viscosity modifier was prepared as follows: about 296 grams of octadecyl isocyanate[1] and 255 grams of hexadecyl alcohol[1] were added to a one liter reaction vessel and heated to about 60° C. with stirring under an $N_2$ atmosphere. About 0.5 gram of a catalyst, dibutyltin dilaurate[1], was added to the reaction mixture within five minutes. The reaction was heated to about 130° C. for two hours. FTIR of the product was run to confirm that the NCO was consumed. The disappearance of the NCO peak at about 2285 cm$^{-1}$ and the appearance of the urethane peaks at about 1740–1680 cm$^{-1}$ and about 1540–1530 cm$^{-1}$ were used to confirm the formation of the hexadecyl, octadecyl carbamate wax. The carbamate wax was poured into the container and allowed to solidify.

[1]Available from Aldrich Chemicals of Milwaukee, Wis.

EXAMPLE 4

This example illustrates the range of physical properties of the carbamate waxes that can be attained by changing the molecular weight of the $R_2$ side group while leaving the $R_1$ side group as octadecyl isocyanate. The synthesis procedure can be followed as described in Example 3 to produce carbamate waxes of desired attributes. However, the hexadecyl alcohol is selectively replaced with the alcohol(s) listed in Table 1 to tailor the desired physical properties to create an engineered molecule.

TABLE 1

Carbamate Waxes
$R_1$—HN—C(=O)—O—$R_2$

| $R_2$ | Chemicals | Viscosity @ 135° C. | Melting Point ° C. | Freezing Point ° C. |
|---|---|---|---|---|
| $C_4H_9OH$ | Butyl alcohol[1] | 2.2 | 63 | 56 |
| $C_6H_{13}OH$ | Hexyl alcohol[1] | 2.3 | 65 | 58 |
| $C_8H_{17}OH$ | Octyl alcohol[1] | 2.6 | 67 | 61 |
| $C_{12}H_{25}OH$ | Dodecyl alcohol[1] | 3.0 | 73 | 68 |
| $C_{16}H_{33}OH$ | Hexadecyl alcohol[1] | 3.4 | 81 | 76 |
| $C_{18}H_{37}OH$ | Octadecyl alcohol[1] | 3.9 | 86 | 81 |
| $C_{22}H_{45}OH$ | Behenyl alcohol[1] | 4.4 | 87 | 80 |

$R_1$ = octadecyl isocyanate
$R_2$ = an alcohol
[1]Available from Aldrich Chemicals of Milwaukee, Wisconsin

[1]Available from Aldrich Chemicals of Milwaukee, Wis. Table 1 discloses the viscosity, melting point, and freezing point of the resulting carbamate waxes for each alcohol. This demonstrates the ability to tailor molecules to give the resulting wax the desired thermal or viscous properties. The resulting carbamate waxes that can be added to a formulation for jetting from a print head as a component to control the viscosity of the formulation all have a viscosity less than about 5 cPs, more preferably less than about 4.4 cPs, and most preferably about 3.4 cPs or less.

EXAMPLE 5

This example demonstrates a method of producing a preferred solid imaging material (SIM) using a preferred phase change SIM carrier composition. More specifically, the SIM was prepared as follows: about 2.38 kilograms (equal to about 34% by weight) of hexadecyl, octadecyl carbamate from example 3; about 0.7 kilograms (equal to about 10% by weight) of Kemamide S-180; about 1.82 kilograms (equal to about 26% by weight) of Rhocell 21; about 1.96 kilograms (equal to about 28% by weight) of Unirez 2974; about 126 grams (equal to about 1.8% by weight) of Irganox 1010; about 14 grams (equal to about 0.2% by weight) of Naugard 445, and 0.385 grams of Savinyl Black RLS were added to a 10 liter stainless steel vessel and heated with stirring to a temperature of 125° C. for five hours to form a homogeneous solution. The SIM was filtered through a heated fiberglass filter. The filtrate was poured into five-pound bottles and allowed to solidify, forming a gram of SIM.

The above procedure can be used to make neutral SIM by not adding any dye, black SIM by adding about 6.3 grams of the Savinyl Black RLS, or any preferred colored SIM by adding preferred solvent dyes, well known in the art.

EXAMPLE 6

This example illustrates the range of physical properties that can be attained for the SIM formulation using the hexadecyl, octadecyl carbamate (HOC) as a viscosity modifier. A SIM formulation can be prepared, using the procedure described in Example 5, by adding the preferred raw materials in the preferred weight percentages as shown in Table 11.

TABLE II

Physical Properties of Example Formulation

| Raw Materials | A | B | C | D | E | F | G |
|---|---|---|---|---|---|---|---|
| LDPE | 100.0 | | | | | | |
| HOC[1] | | | 45.00 | 42.83 | 37.93 | 37.53 | 38.02 |
| S-180[2] | | 25.50 | | | | | |
| C-700[3] | | 17.00 | | 5.49 | 9.31 | | 9.80 |
| PEW 500[4] | | 6.00 | | | | | |
| EP 1100[5] | | 3.00 | | | | | |
| KE 100[6] | | 17.00 | 13.50 | 1.96 | 7.84 | 7.84 | 7.84 |
| Rhocell[7] | | | 11.50 | 10.68 | 14.99 | 39.20 | 14.90 |
| R 101[8] | | 9.30 | | | | | |
| Sant 278[9] | | 4.00 | | | | | |
| Unirez 2974[10] | | 18.00 | 28.00 | 28.71 | 24.50 | 9.80 | 27.44 |
| Unirez 2614[10] | | | | | | | |
| Unirez 2942[10] | | | | | | | |
| Unirez 2224[10] | | | | 8.33 | 3.43 | 3.43 | |
| Naugard 445[11] | | 0.20 | | | 0.20 | 0.20 | |
| Irganox 1010[12] | | | 2.00 | 2.00 | 1.80 | 2.00 | 2.00 |
| Total Weight Percent | 100 | 100 | 100 | 100 | 100 | 100 | 100 |
| Viscosity @ 135° C. (cPs) | | 13 | 12.9 | 13.2 | 13 | 13.5 | 13.1 |
| Flex Yield Stress (psi) | 1450 | 800 | 1434 | 1130 | 1050 | 990 | 1,200 |
| Flex Modulus (psi) | 30,450 | 30,000 | 32,180 | 36,300 | 27,100 | 26,100 | 31,000 |

TABLE II-continued

Physical Properties of Example Formulation

| Raw Materials | A | B | C | D | E | F | G |
|---|---|---|---|---|---|---|---|
| Flex Work (in*lb/in³) | | 13 | 513 | 98 | 300 | 260 | 300 |
| Tensile Elongation (%) | 181 | 14 | 12 | 22 | 70 | 145 | 48 |

[1]HOC (hexadecyl, octadecyl carbamate) available commercially from American Dye Source of Montreal, Canada
[2]Keramide S180 stearyl stearamide available commercially from Witco Chemical company of Memphis, TN
[3]C-700 microcrystalline hydrocarbon wax available commercially from Bareco Products of Rock Hill, SC
[4]PEW 500 Polywax available commercially from Baker Petrolite of Sugar Land, TX
[5]EP 1100 ethylene propylene available commercially from Baker Petrolite of Sugar Land, TX
[6]KE 100 glycerol ester of hydrogenated abietic (rosin) acid available commercially from Arkawa Chemical USA of Chicago, IL
[7]Rhocell 21 hydroabietol phthalate available commercially from Rho Chemical Company of Joliet, IL
[8]Regalite R 101 hydrogenated mixed aromatic resin available commercially from Chem Central of Santa Fe Springs, CA
[9]Santicizer 278 alkylbenzyl phthalate available commercially from Solutia, Inc. of St. Louis, MO
[10]Unirez polyamide available commercially from Arizona Chemicals of Atlanta, GA
[11]Naugard 445 antioxidant available commercially from Uniroyal Chemical Co. of Middlebury, CT
[12]Irganox 1010 antioxidant available commercially from Ciba-Geigy Materials Management of Tarrytown, NY Formulation A is low density polyethylene (LDPE) and represents the desired physical properties to achieve plastic-like properties for the SIM formulation. Formulation B is representative of the physical properties of TJ88 SIM, commercially available from 3D Systems, Inc. Formulation C represents the achievable Flex Yield Stress. Whereas, Formulations D, E and F represent the achievable Flex Modulus, Flex Work and Tensile Elongation, respectively. Formulation G represents the balance of the physical properties with the viscosity constraint of 13 centipoise (cPs).

EXAMPLE 7

This example illustrates formulations that solve for thermal runaway in the solid imaging layer deposition process due to inadequate heat removal from a solid build object created in a rapid prototype model. Thermal runaway was assessed using a thermal diagnostic, hotpart, built on a ThermoJet™ printer and compared to results using Formulation B, available commercially from 3D Systems, Inc. as TJ88, as a baseline. A hotpart is a diagnostic part that is built under the highest heat build conditions in the printer, requires shorter X-axis travel to build, and takes less time to complete so that the part builds up heat during the build process. Results are reported as same (S), better (B) or worse (W) by examining the fine features and surface quality of the hotpart. The SIM formulation can be prepared, using the procedure described in Example 5, by adding the preferred raw materials in the preferred weight percentage as shown in Table III.

TABLE III

Thermal Runaway Results of Example Formulation

| Raw Materials | B | H | I | J | K | L | M | N | O | P |
|---|---|---|---|---|---|---|---|---|---|---|
| LDPE | | | | | | | | | | |
| HOC[1] | | 35.00 | 38.00 | 43.00 | 47.00 | 51.00 | 38.00 | 43.00 | 42.20 | 41.00 |
| S-180[2] | 25.50 | 6.00 | | | | | | | | |
| C-700[3] | 17.00 | 4.00 | 8.00 | | | | 5.00 | | | |
| PEW 500[4] | 6.00 | | | | | | | | | |
| EP 1100[5] | 3.00 | | | | | | 3.00 | | | |
| KE 100[6] | 17.00 | | 2.00 | | 6.00 | 4.00 | | 2.00 | 3.50 | 4.00 |
| Rhocell[7] | | 25.00 | 24.00 | 25.00 | 15.00 | 10.00 | 25.00 | 25.00 | 27.00 | 39.00 |
| R 101[8] | 9.30 | | | | | | | | | |
| Sant 278[9] | 4.00 | | | | | | | | | |
| Unirez 2974[10] | 18.00 | 28.00 | 18.00 | 30.00 | 22.00 | 24.00 | 27.00 | 20.00 | 22.50 | 5.00 |
| Unirez 2614[10] | | | | | | | | | | |
| Unirez 2942[10] | | | | | | | | | | |
| Unirez 2224[10] | | | 8.00 | | 8.00 | 10.00 | | 8.00 | 2.80 | 10.00 |
| Naugard 445[11] | 0.20 | | | | 0.20 | | | | | |
| Irganox 1010[12] | | 2.00 | 2.00 | 2.00 | 2.00 | 1.00 | 2 | 2 | 2 | 1 |
| Total Weight % | 100 | 100 | 100 | 100 | 100 | 100 | 100 | 100 | 100 | 100 |
| Viscosity @ 135° C. (cPs) | 13 | 12.9 | 13.3 | 12.8 | 12.9 | 12.7 | 13.1 | 13.6 | 13.1 | 12.8 |
| Thermal Runaway | N/A | S | S | S | S | S | B | B | B | W |

See raw materials list from Example 6.

Formulations H through L show thermal runaway results to be equal to that of Formulation B. Formulations M through O show thermal runaway results to be better than Formulation B, while Formulation P shows worse results.

EXAMPLE 8

This example illustrates formulations that solve for adhesive curl in the solid imaging layer deposition process due to excessive shrinkage leading to curl force exceeding the adhesion of supports to build platform. Adhesive curl was assessed using a curl diagnostic, coldpart, built on a ThermoJet printer and compared to results using Formulation B, available commercially from 3D Systems, Inc. as TJ88, as a baseline. A coldpart is a diagnostic part that is built under the coolest heat build conditions in the printer, requires longer X-axis travel to build and takes longer to complete so that the part cools down during the build process. Results are reported as same (S), better (B) or worse (W) by examining the fine features and surface quality of the coldpart. The SIM formulation can be prepared, using the procedure described in Example 5, by adding the preferred raw materials in the preferred weight percentage as shown in Table IV.

TABLE IV

Adhesive Curl Results of Example Formulation

| Raw Material | B | Q | R | S | T | U | V | W | X |
|---|---|---|---|---|---|---|---|---|---|
| LDPE | | | | | | | | | |
| HOC[1] | | 42.57 | 37.00 | 42.20 | 38.00 | 44.00 | 41.00 | 41.00 | 50.00 |
| S-180[2] | 25.50 | | | | | | | | |
| C-700[3] | 17.00 | | 10.00 | | 8.00 | 4.00 | 6.50 | | |
| PEW 500[4] | 6.00 | | | | | | | | |
| EP 1100[5] | 3.00 | | | | | | | 3.00 | |
| KE 100[6] | 17.00 | 1.98 | 2.00 | 3.50 | 2.00 | 3.00 | 3.00 | | 4.00 |
| Rhocell[7] | | 29.70 | 24.00 | 27.00 | 24.00 | 23.00 | 24.00 | 25.00 | 10.00 |
| R 101[8] | 9.30 | | | | | | | | |
| Sant 278[9] | 4.00 | | | | | | | | |
| Unirez 2974[10] | 18.00 | 17.82 | 17.00 | 22.50 | 18.00 | 10.00 | 7.00 | 29.00 | 27.00 |
| Unirez 2614[10] | | | | | | | | | |
| Unirez 2942[10] | | | | | | | | | |
| Unirez 2224[10] | | 5.94 | 8.00 | 2.80 | 8.00 | 14.00 | 16.50 | | 8.00 |
| Naugard 445[11] | 0.20 | | | | | | | | |
| Irganox 1010[12] | | 2.00 | 2.00 | 2.00 | 2.00 | 2.00 | 2 | 2 | 1 |
| Total Weight % | 100 | 100 | 100 | 100 | 100 | 100 | 100 | 100 | 100 |
| Viscosity @ 135° C. (cPs) | 13 | 12.9 | 12.9 | 13.1 | 13.3 | 12.3 | 12.4 | 13.4 | 13.1 |
| Adhesive Curl | N/A | B | B | B | B | B | B | B | W |

See raw materials list from Example 6.

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Accordingly, it is intended to embrace all such changes modifications and variation that fall within the spirit and broad scope of the appended claims. All patent applications, patents and other publications cited herein are incorporated by reference in their entirety.

What is claimed:

1. A formulation for use in jetting from a print head comprising:
   (a) a component to control the viscosity of the formulation, the component being a linear alkyl urethane;
   (b) a component to promote adhesion to a substrate;
   (c) a component to impart toughness to the formulation; and
   (d) a component to control shrinkage of the jetted formulation.

2. The formulation according to claim 1 wherein the linear alkyl urethane is a linear alkyl carbamate defined by the structure

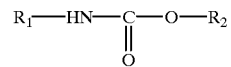

wherein $R_1$ is an isocyanate having a carbon chain length of from about $C_4$ to about $C_{60}$ and $R_2$ is an alcohol having a carbon chain length of from about $C_4$ to about $C_{60}$.

3. The formulation according to claim 1 wherein the component to control shrinkage of the jetted formulation is selected from the group consisting of a urethane wax, an amide wax, alkyl wax and combinations thereof.

4. The formulation according to claim 1 wherein the component to impart toughness is a polyamide resin.

5. The formulation according to claim 2 wherein the linear alkyl carbamate is selected from the group consisting of octadecyl, octadecyl carbamate; dodecyl, octadecyl carbamate; hexadecyl, octadecyl carbamate; and hexyl, octadecyl carbamate.

6. The formulation according to claim 1 wherein the component to control adhesion to a substrate is selected from the group consisting of a rosin carbamate, a rosin ester, glycerin rosin ester, hydrogenated pentaerythritol ester, hydrogenated glycerin ester, modified tall oil rosin, a polymerized rosin, an aromatic hydrocarbon rosin, an aliphatic hydrocarbon rosin and combinations thereof.

7. The formulation according to claim 1 wherein the component to promote adhesion to a substrate is a rosin carbamate tackifier selected from the group consisting of butyl [3-({[(7-isopropyl-1,4a-dimethyltetradecahydro-1-phenanthrenyl)methoxy]carbonyl}amino)-1,4,4-trimethylcyclohexyl]methyl carbamate; hexyl [3-({[(7-isopropyl-1,4a-dimethyltetradecahydro-1-phenanthrenyl)methoxy]carbonyl}amino)-1,4,4-trimethylcyclohexyl]methyl carbamate; octyl [3-({[(7-isopropyl-1,4a-dimethyltetradecahydro-1-phenanthrenyl)methoxy]

carbonyl}amino)-1,4,4-trimethylcyclohexyl]methyl carbamate; dodecyl [3-({[(7-isopropyl-1,4a-dimethyltetradecahydro-1-phenanthrenyl)methoxy] carbonyl}amino)-1,4,4-trimethylcyclohexyl]methyl carbamate; and octadecyl [3-({[(7-isopropyl-1,4a-dimethyltetradecahydro- 1-phenanthrenyl)methoxy] carbonyl}amino)-1,4,4-trimethylcyclohexyl]methyl carbamate.

8. The formulation according to claim 4 wherein the component to impart toughness to the formulation further includes a tetra-amide.

9. The formulation according to claim 3 wherein the urethane wax is the reaction product of a monohydric alcohol and a mono-isocyanate.

10. The formulation according to claim 9 wherein the monohydric alcohol is selected from the group consisting of an aliphatic alcohol, an aliphatic/aromatic alcohol, an aromatic alcohol, and a fused ring alcohol and combinations thereof.

11. The formulation according to claim 10 wherein the monohydric alcohol is selected from the group consisting of butyl alcohol, hexyl alcohol, octyl alcohol, dodecyl alcohol, hexadecyl alcohol, octadecyl alcohol, and behenyl alcohol.

12. The formulation according to claim 1 wherein the formulation further includes an anti-oxidant.

13. The formulation according to claim 4 wherein the polyamide resin has a weight average molecular weight in the range of from about 3,000 to about 32,000.

14. A solid imaging material for use in three-dimensional model rapid prototyping comprising:
    a component to control the viscosity of the material, the component being a linear alkyl urethane;
    a component to promote adhesion to a substrate;
    a component to impart toughness to the material; and
    a component to control thermal runaway in a three-dimensional build object formed of the jetted material.

15. The material according to claim 14 wherein the linear alkyl urethane is a linear alkyl carbamate defined by the structure

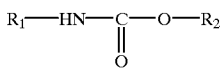

wherein $R_1$ is an isocyanate having a carbon chain length of from about $C_4$ to about $C_{60}$ and $R_2$ is an alcohol having a carbon chain length of from about $C_4$ to about $C_{60}$.

16. The material according to claim 14 wherein the component to control thermal runaway of the jetted material is selected from the group consisting of a urethane wax, an amide wax, alkyl wax and combinations thereof.

17. The material according to claim 14 wherein the component to impart toughness is a polyamide resin.

18. The material according to claim 17 wherein the polyamide resin has a weight average molecular weight in the range of from about 3,000 to about 32,000.

19. The material according to claim 15 wherein the linear alkyl carbamate is selected from the group consisting of octadecyl, octadecyl carbamate; dodecyl, octadecyl carbamate; hexadecyl, octadecyl carbamate; and hexyl, octadecyl carbamate.

20. The material according to claim 14 wherein the component to control adhesion to a substrate is selected from the group consisting of a rosin carbamate, a rosin ester, glycerin rosin ester, hydrogenated pentaerythritol ester, hydrogenated glycerin ester, modified tall oil rosin, a polymerized rosin, an aromatic hydrocarbon rosin, an aliphatic hydrocarbon rosin and combinations thereof.

21. The material according to claim 14 wherein the component to promote adhesion to a substrate is a rosin carbamate tackifier selected from the group consisting of butyl [3-({[(7-isopropyl-1,4a-dimethyltetradecahydro-1-phenanthrenyl)methoxy]carbonyl}amino)-1,4,4-trimethylcyclohexyl]methyl carbamate; hexyl [3-({[(7-isopropyl-1,4a-dimethyltetradecahydro-1-phenanthrenyl)methoxy]carbonyl}amino)-1,4,4-trimethylcyclohexyl]methyl carbamate; octyl [3-({[(7-isopropyl-1,4a-dimethyltetradecahydro-1-phenanthrenyl)methoxy]carbonyl}amino)-1,4,4-trimethylcyclohexyl]methyl carbamate; dodecyl [3-({[(7-isopropyl-1,4a-dimethyltetradecahydro-1-phenanthrenyl)methoxy]carbonyl}amino)-1,4,4-trimethylcyclohexyl]methyl carbamate; and octadecyl [3-({[(7-isopropyl-1,4 a-dimethyltetradecahydro-1-phenanthrenyl)methoxy]carbonyl}amino)-1,4,4-trimethylcyclohexyl]methyl carbamate.

22. The material according to claim 14 wherein the component to impart toughness to the material further includes a tetra-amide.

23. The material according to claim 16 wherein the urethane wax is the reaction product of a monohydric alcohol and a mono-isocyanate.

24. The material according to claim 23 wherein the monohydric alcohol is selected from the group consisting of an aliphatic alcohol, an aliphatic/aromatic alcohol, an aromatic alcohol, and a fused ring alcohol and combinations thereof.

25. The material according to claim 24 wherein the monohydric alcohol is selected from the group consisting of butyl alcohol, hexyl alcohol, octyl alcohol, dodecyl alcohol, hexadecyl alcohol, octadecyl alcohol, and behenyl alcohol.

26. The material according to claim 14 wherein the material further includes an anti-oxidant.

27. A formulation for use in jetting from a print head comprising:
    (a) a component to impart toughness to the formulation;
    (b) a component to promote adhesion;
    (c) a component to control shrinkage of the jetted formulation; and
    (d) a component to control the viscosity of the formulation, the component being compatible with the components in a, b, and c above and having a viscosity of less than about 5 cPs.

28. The formulation according to claim 27 wherein the component to control the viscosity of the formulation is a linear alkyl urethane.

29. The formulation according to claim 28 wherein the linear alkyl urethane is a linear alkyl carbamate defined by the structure

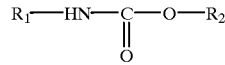

wherein $R_1$ is an isocyanate having a carbon chain length of from about $C_4$ to about $C_{60}$ and $R_2$ is an alcohol having a carbon chain length of from about $C_4$ to about $C_{60}$.

30. The formulation according to claim 29 wherein the linear alkyl carbamate is selected from the group consisting of octadecyl, octadecyl carbamate; dodecyl, octadecyl carbamate; hexadecyl, octadecyl carbamate; and hexyl, octadecyl carbamate.

31. The formulation according to claim 27 wherein the component to impart toughness is a polyamide resin.

32. The formulation according to claim 31 wherein the polyamide resin has a weight average molecular weight in the range of from about 3,000 to about 32,000.

33. The formulation according to claim 27 wherein the component to control thermal runaway of the jetted formulation is selected from the group consisting of a urethane wax, an amide wax, alkyl wax and combinations thereof.

34. The formulation according to claim 27 wherein the component to control adhesion to a substrate is selected from the group consisting of a rosin carbamate, a rosin ester, glycerin rosin ester, hydrogenated pentaerythritol ester, hydrogenated glycerin ester, modified tall oil rosin, a polymerized rosin, an aromatic hydrocarbon rosin, an aliphatic hydrocarbon rosin and combinations thereof.

35. The formulation according to claim 34 wherein the component to promote adhesion to a substrate is a rosin carbamate tackifier selected from the group consisting of butyl [3-({[(7-isopropyl-1,4a-dimethyltetradecahydro-1-phenanthrenyl)methoxy]carbonyl}amino)-1,4,4-trimethylcyclohexyl]methyl carbamate; hexyl [3-({[(7-isopropyl-1,4a-dimethyltetradecahydro-1-phenanthrenyl)methoxy]carbonyl}amino)-1,4,4-trimethylcyclohexyl]methyl carbamate; octyl [3-({[(7-isopropyl-1,4a-dimethyltetradecahydro-1-phenanthrenyl)methoxy]carbonyl}amino)-1,4,4-trimethylcyclohexyl]methyl carbamate; dodecyl [3-({[(7-isopropyl-1,4a-dimethyltetradecahydro-1-phenanthrenyl)methoxy]carbonyl}amino)-1,4,4-trimethylcyclohexyl]methyl carbamate; and octadecyl [3-({[(7-isopropyl-1,4a-dimethyltetradecahydro-1-phenanthrenyl)methoxy]carbonyl}amino)-1,4,4-trimethylcyclohexyl]methyl carbamate.

36. The formulation according to claim 27 wherein the component to impart toughness to the formulation further includes a tetra-amide.

37. The formulation according to claim 33 wherein the urethane wax is the reaction product of a monohydric alcohol and a mono-isocyanate, the monohydric alcohol further being selected from the group consisting of an aliphatic alcohol, an aliphatic/aromatic alcohol, an aromatic alcohol, and a fused ring alcohol and combinations thereof.

38. The formulation according to claim 37 wherein the alcohol is selected from the group consisting of butyl alcohol, hexyl alcohol, octyl alcohol, dodecyl alcohol, hexadecyl alcohol, octadecyl alcohol, and behenyl alcohol.

39. The formulation according to claim 27 wherein the formulation further includes an anti-oxidant.

* * * * *

UNITED STATES PATENT AND TRADEMARK OFFICE
CERTIFICATE OF CORRECTION

PATENT NO. : 6,395,811 B1
DATED : May 28, 2002
INVENTOR(S) : Nguyen et al.

It is certified that error appears in the above-identified patent and that said Letters Patent is hereby corrected as shown below:

Column 8,
Line 50, should read -- carbonyl}amino)-1,4,4-trimethylcyclohexyl]methyl --

Signed and Sealed this

First Day of June, 2004

JON W. DUDAS
*Acting Director of the United States Patent and Trademark Office*